United States Patent [19]
Johnson

[11] Patent Number: 5,165,897
[45] Date of Patent: Nov. 24, 1992

[54] PROGRAMMABLE TACTILE STIMULATOR ARRAY SYSTEM AND METHOD OF OPERATION

[75] Inventor: Alfred D. Johnson, Oakland, Calif.
[73] Assignee: TiNi Alloy Company, Oakland, Calif.
[21] Appl. No.: 565,564
[22] Filed: Aug. 10, 1990
[51] Int. Cl.$^5$ .............................................. G09B 21/00
[52] U.S. Cl. .................... 434/113; 434/112; 128/44; 340/825.19; 400/124
[58] Field of Search ............... 434/112, 113, 114, 258; 128/32, 44, 67; 273/DIG. 27; 400/124; 340/407, 825.19

[56] References Cited

U.S. PATENT DOCUMENTS

| | | | |
|---|---|---|---|
| 2,866,279 | 12/1958 | Surber | 434/114 |
| 3,831,296 | 8/1974 | Hagle | 434/112 |
| 4,194,190 | 3/1980 | Bareau | 434/114 X |
| 4,283,178 | 8/1981 | Tetzlaff | 434/114 |
| 4,581,491 | 4/1986 | Boothroyd | 340/407 X |
| 4,633,121 | 12/1986 | Ogawa et al. | 434/114 |
| 4,664,632 | 5/1987 | Tretiakoff et al. | 434/114 |
| 4,944,727 | 7/1990 | Mclevy | 128/772 X |

FOREIGN PATENT DOCUMENTS 0281860 11/1988 Japan.

*Primary Examiner*—Richard J. Apley
*Assistant Examiner*—Joe H. Cheng
*Attorney, Agent, or Firm*—Flehr, Hohbach, Test, Albritton & Herbert

[57] ABSTRACT

A tactile stimulator array system and method of operational incorporating a plurality of tactile elements having touch-stimulating portions which are positioned through corresponding openings formed in a touch plate. The tactile elements are moved by actuator wires which are formed of a shape-memory alloy material. Electrical control signals from a programmed computer system heat individual wires through the materials phase change transition temperature so that the wires contract to their memory shapes and raise the elements. The touch-stimulating portions then extend above the touch plate where they can be sensed by the user.

18 Claims, 2 Drawing Sheets

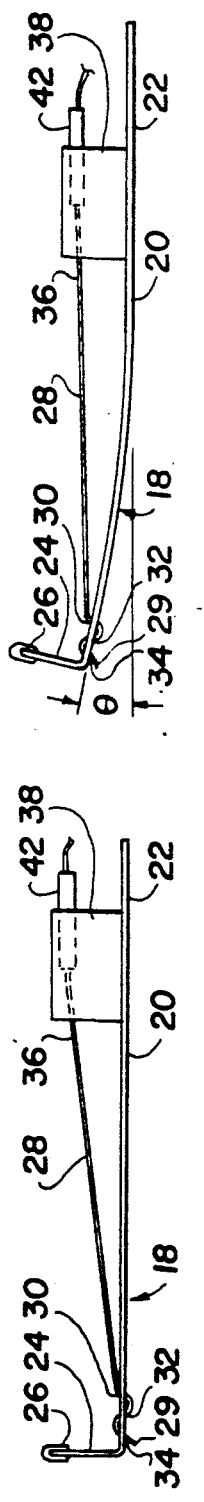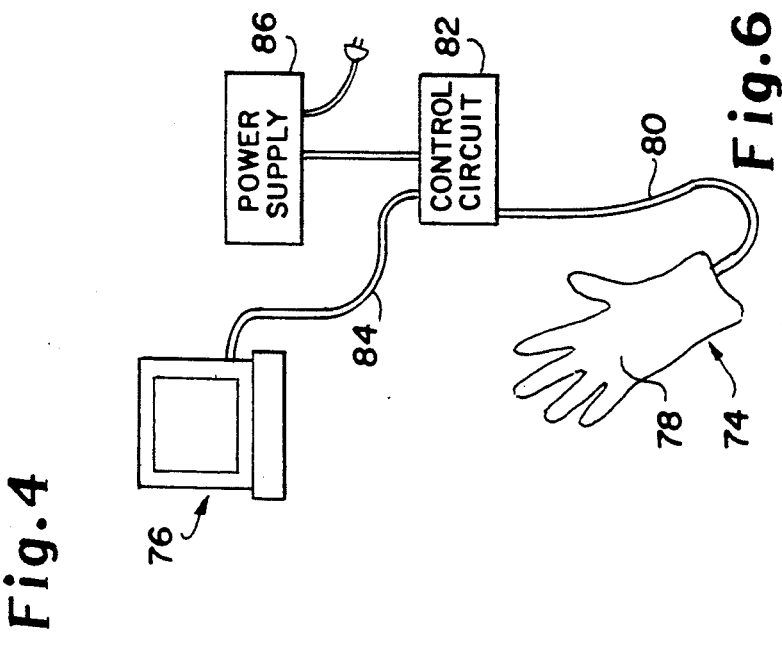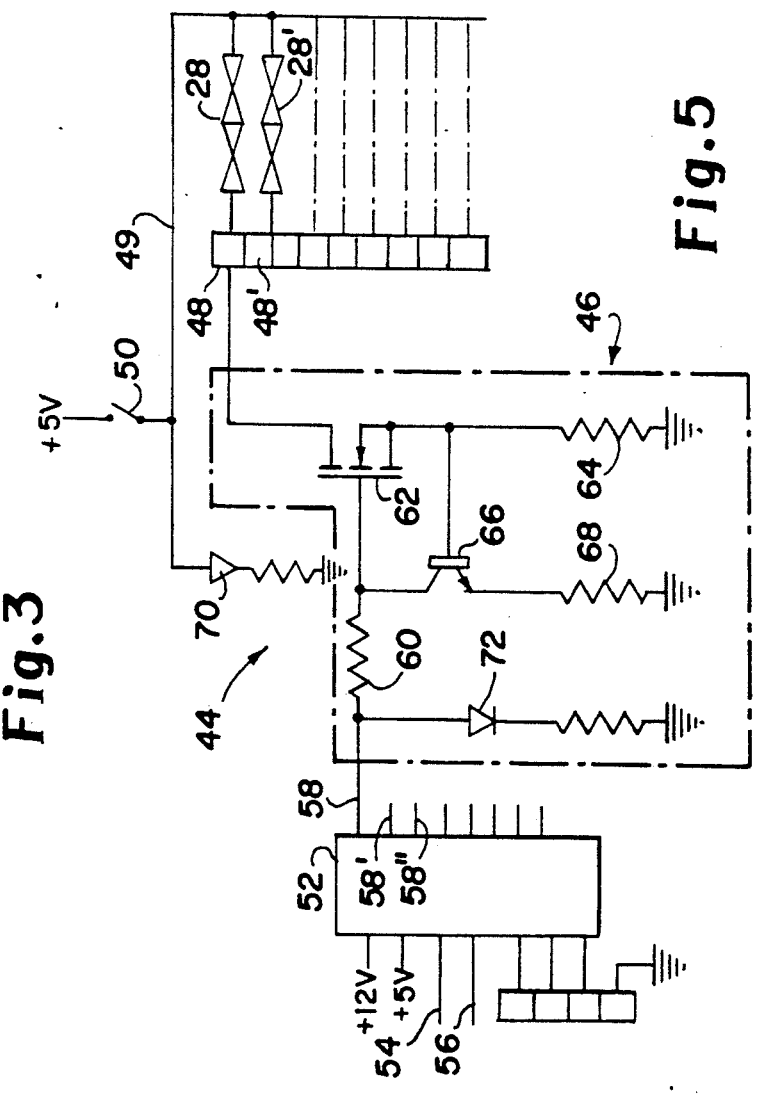

PROGRAMMABLE TACTILE STIMULATOR ARRAY SYSTEM AND METHOD OF OPERATION

This invention was reduced to practice under United States Air Force Small Business Innovation Research contract #F33-88-C-0541.

BACKGROUND OF THE INVENTION

This invention relates to computer-controlled time-varying stimulation of sense organs such as the skin on a person's finger, hand, or other organ in order to convey information. In particular, the invention relates to a device for presenting patterns of tactile stimulation which can represent symbols, warnings, a sense of "feel", or data on which the user is able to act. The invention can be used in conjunction with other sensory input such as simulated vision, sound, and force feedback.

Virtual reality studies as reported in the October, 1987 edition of *Scientific American* employ stereo visual and auditory feedback along with force and tactile stimulation to create, by computer simulation, an artificial environment for the purpose of teaching or entertaining a human subject. In one practical application, these stimuli represent the real environment of a remotely-located tele-robot equipped with cameras, microphones, force transducers and tactile sensors. Alternatively, the environment can be a completely artificial one created by computer software. A particular practical use is for interfacing with computer-aided design systems.

Visual feedback is accomplished by means of stereo television goggles. Sound stimulation is provided aurally by a conventional headset. Force feedback is provided by electric motors which resist motion of the hand or arm. A sense of touch is similarly provided by tactual stimulators which press against the skin in time-varying patterns.

Tactile stimulation feedback is desirable in virtual reality scenarios, but conventional means for providing tactile stimulation are very limited. The conventionally available methods include electrocutaneous stimulation, single point stimulators driven by electromagnet, and vibrotactile pattern generators driven by piezoelectric actuators. Single point stimulation conveys no information about shapes. Electrical stimulation may be painful. Piezoelectric actuators are bulky and noisy.

The need has been recognized for a stimulation device providing an array of actuators on each tactile surface, such as the finger tip, so that patterns may be distinguished. The device should be small and light enough to fit inside a glove to be worn by the user, and thus to move with motion of the hand.

Teleoperator systems may also be used in situations where conditions in the environment are too dangerous for a human operator. Similar technology may be used in simulation of operation in a size domain in which actual human operation is awkward or impossible. Exoskeletons may increase strength of the bare human arm in handling massive objects. On the very small scale, manipulation of individual cells or cell components, such as DNA, have been contemplated using microactuators. In either case, the computer provides the operator with information which simulates the "sensing" of textures, edges, shapes and the like which the robot encounters in accomplishing its task. This information is presented in a manner such that it aids the operator in accomplishing the required task. This simulation may emulate natural events such as when the remote robot finger makes contact with a nut which is to be tightened onto a bolt. Alternatively, information may be conveyed in ways which do not emulate nature but must be learned. An example is a vibration to warn a pilot of an impending stall.

In a variety of diseases such as diabetes and AIDS, peripheral sense is diminished early in the progress of the disease. This is due to degeneration of the nervous system which results in peripheral neuropathy. Methods of diagnosis and evaluation are needed for these and other diseases. A versatile, portable, programmable tactile stimulation device may prove to be an inexpensive method of quantifying the extent and quality of neuropathy.

Heretofore, little has been known about the limitations and appropriate methods for tactile stimulation for the purposes of tactile feedback and clinical evaluation. For example, it is uncertain exactly how many elements should be used.

The prior art includes the vibratactile stimulator OPTACON, which is a brand name for a device produced by James Bliss and sold by Telesensory Systems of Sunnyvale, Calif. This device uses vibrating pins, driven by piezo-electric bimorphs, to provide vibratory stimulation to the finger tip. Among the disadvantages of the Optacon are the large size of the actuators, the undesirable noise generated during use, and the very small forces that are generated.

OBJECTS AND SUMMARY OF THE INVENTION

It is a general objection of the present invention to provide new and improved apparatus and method for tactile stimulation.

Another object is to provide method and apparatus of the type described which provides individual control of a plurality of tactile elements.

Another object is to provide method and apparatus of the type described in which movement of the tactile elements is by means of a shape-memory alloy material.

Another object is to provide a fast, durable, compact, silent, forceful tactile stimulation device.

Another object is to provide a tactile stimulation system which provides adequate stimulation under varying conditions of finger pressure.

Another object is to provide a tactile stimulation device of the type described in which the tactile elements can be mounted together with a high density, such as with micron or sub-millimeter spacing, for compactness.

Another object is to provide a tactile stimulation device which moves a fixed distance above a plane, such as on the order of one millimeter.

Another object is to provide a versatile method of stimulation with multiple elements spaced appropriately for optimum transfer of information.

Another object is to provide an actuator capable of either rapidly-varying or steady-state signals.

Another object is to provide a method of actuation of the type described in which rapid onset is accomplished by resistance heating of the actuator element, followed by controlled current which maintains the up position without overheating the actuator element.

Another object is to provide a device of the type described which is readily interfaced to a digital computer.

The invention in summary provides a tactile stimulator array system which includes a plurality of tactile elements having touch-stimulating portions which are moved between first and second positions by shape-memory alloy actuators. The actuators move between a contracted or "memory" shape when heated through a phase change transition temperature, and an elongated shape when cooled below that temperature. Movement of the touch-stimulating portions by means of time-varying signals, such as from a programmed computer system, provides tactile feedback to a person using the stimulator array.

The device is useful for virtual reality studies such as training cockpits for pilots and operators, for tactile feedback in tele-operator systems for remote operation of robots, for communication by the visually or hearing impaired, for laboratory and clinical evaluation of medical conditions including peripheral neuropathy, or as part of a control system for computer games of the type employing gloves which are worn to interact with the computer, or as an enhancement to a mouse for the control of input-output functions in personal computer use.

One embodiment of the device comprises a set of levers cut from a sheet of elastic metal, each lever attached to a wire of nickel-titanium shape-memory alloy in such a way that contraction of the shape-memory alloy wire causes the lever to bend upward, raising a portion of the lever above a surface where its motion is detected by the sense of touch.

The foregoing and additional objections and features of the invention will appear from the following specification in which the several embodiments have been set forth in detail in conjunction with the accompanying drawings.

BRIEF DESCRIPTION OF THE DRAWINGS

FIG. 3 is a fragmentary vertical section view of the array system of FIG. 1 showing one tactile element and its associated shape-memory alloy actuator in a first operating position;

FIG. 4 is a view similar to FIG. 3 showing a changed position of the tactile element and its actuator;

FIG. 5 is a schematic diagram showing the control circuit for use with the array system of FIG. 1;

FIG. 6 is a schematic diagram showing an implementation of another embodiment of the invention under programmed control of a computer system.

DESCRIPTION OF THE PREFERRED EMBODIMENTS

Figure 1:
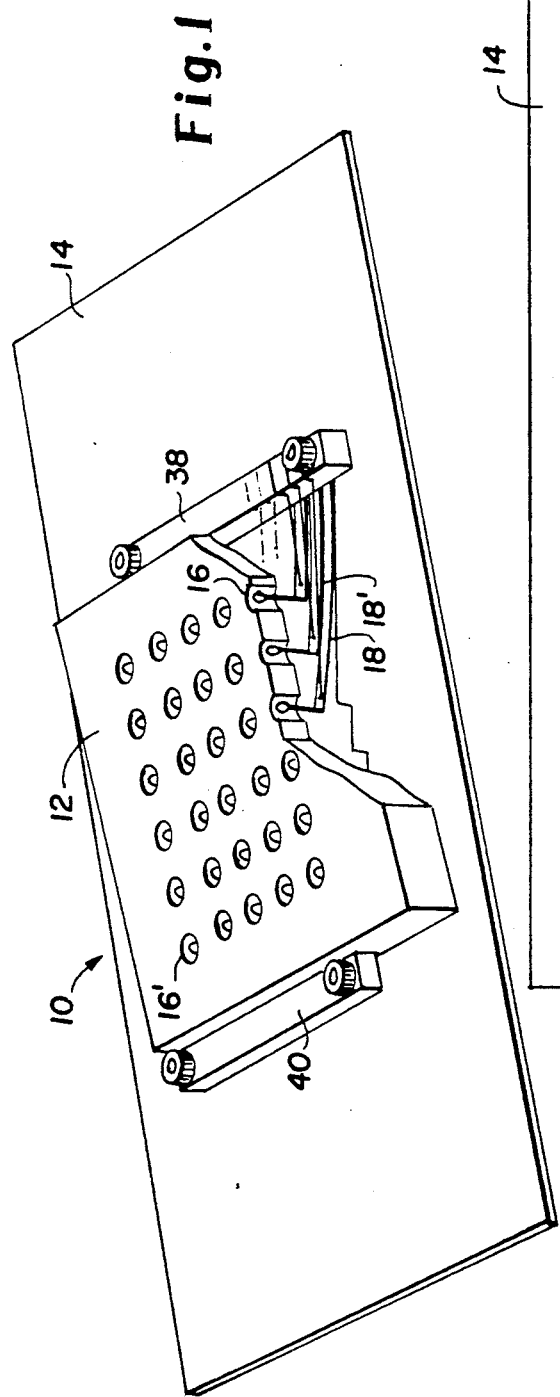
FIG. 1 is a perspective, partially cut-away, view illustrating components of a tactile stimulator array system according to one embodiment of the invention.

In the drawings FIG. 1 illustrates generally at 10 a stimulator array system according to one embodiment which provides tactile feedback to a human user. As used herein, tactile feedback means time-varying tactile signals which are presented to human sense organs, such as a person's fingers, for the purpose of conveying information. For example, the information can be the shape and texture of a remote object, which may be either real or virtual. In the case of a real object, the shape and texture information may be generated by tactile sensors in contact with the surface of a solid object, converted to electrical signals, and then transmitted via computer to tactile stimulator array system 10. In the case of virtual objects, information may be created by computer software to simulate the shape and texture of entities which are represented by numerical description, such as CAD drawings, icons or video game sprites. To convey shape and texture information, tactile feedback would in general utilize through the invention arrays containing multiple stimulators which move independently of each other.

Stimulator array system 10 includes a touch plate 12 which is mounted on a base plate 14 which in turn is mounted on a suitable support or housing, not shown. Touch plate 12 is comprised of a plurality, through the touch plate in a series of rows. The openings are suitably spaced-apart so that one or more of the person's fingers can be comfortably placed over the array of openings.

The array system further includes a plurality of tactile elements 18, 18', each of which is associated with a respective opening 16, 16' in the touch plate. As best shown in FIGS. 3 and 4, tactile elements 18 are comprised of elongate, thin and flexible cantilever beams 20, each of which has a proximal end 22 integral with base plate 14 and a distal end 24. The distal end is bent upwardly at substantially a right angle so as to project at least partially through the associated opening 16. A suitable cap 26, which can be of a plastic material, is secured to the distal end of each cantilever beam for comfortable contact with the person's fingers.

Figure 2:
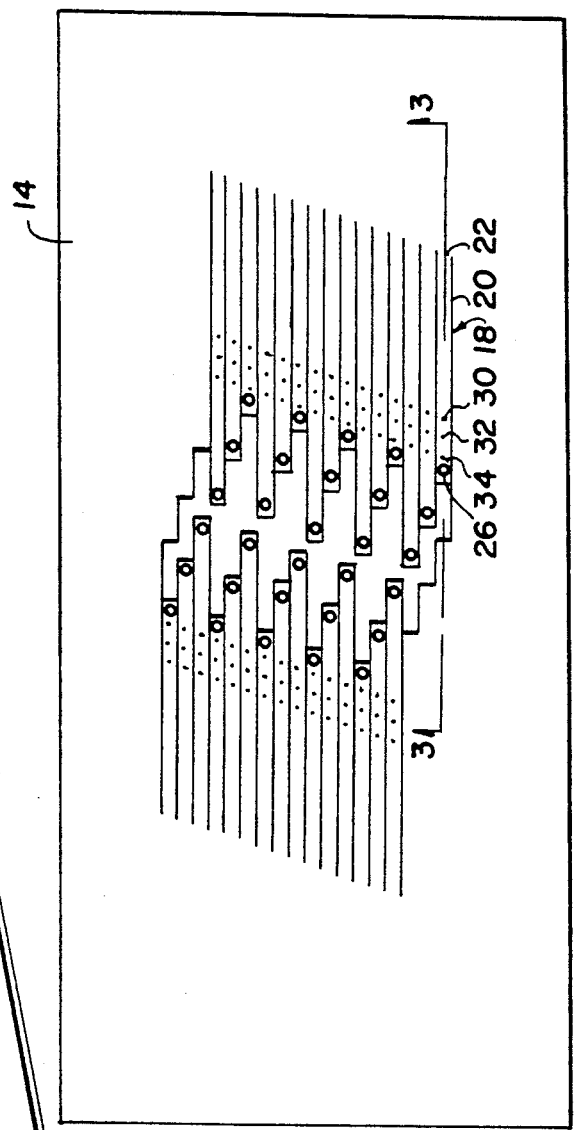
FIG. 2 is a plan view of the tactile elements for the system of FIG. 1.

FIG. 2 illustrates in plan the cantilever beam elements 18 formed integral with the common base plate 14. Preferably the base plate and elements are made from a suitable spring metal material, such as BeCu. The pattern of cantilever elements can advantageously be formed on a flat blank plate of BeCu or other such material by means of conventional chemical etching techniques, followed by bending of the beam ends and heat treatment. FIG. 2 shows thirty elements closely spaced together into a high density array for compactness. It is understood that the pattern and number of elements can be varied as required for a particular application. The longitudinal positions of adjacent cantilever elements are staggered so that, with the base plate mounted under the touch plate, the distal ends 24 are aligned with and project upwardly through the proper openings.

Actuator means for the tactile elements is provided and includes a plurality of wire actuators 28 formed of a shape-memory alloy material, also called "SMA" material. The shape-memory alloy material can be TiNi, which is a nickel-titanium alloy, or other suitable Joule-effect alloy. These alloys undergo a temperature-dependent phase change at near ambient room temperature. At room temperature, the metal is easily deformed plastically by as much as a few percent, and remains deformed until the temperature is raised above the transition temperature, when it forcefully reverts to its original or memory shape. As used herein, "memory" shape means the contracted shape of the wire in its high temperature phase, and "deformed" shape means the elongated shape of the wire in its low temperature phase. As much as a Joule per gram of work may be accomplished in the shape recovery. Actuation may be by the application of heated fluid, or by Joule heating of the SMA material itself by passing an electric current through the wire.

Separate SMA wire actuators 28 are provided for each cantilever tactile element 18. As best illustrated in FIGS. 3 and 4 for the typical tactile element 18, one end 29 of actuator wire 28 is threaded through three small openings 30, 32 and 34 in the distal end of the cantilever. The opposite end 36 of the wire is raised above the plane of the cantilevers and is attached to an anchor block 38. The anchor block is secured above the top surface of base plate 14 and extends along the proximal ends of the cantilevers. As shown in FIG. 1, a second anchor block 40 is provided on the opposite side of touch plate 12 for securing the actuator wires which are connected to and operate the array of cantilevers on that side of the base plate. A tube 42 is secured as by swaging onto the proximal end of each actuator wire for securing the wire to the anchor block. The swage tubes 42 also provide electrical connections to the control circuit 44, which is shown schematically in FIG. 5. The control circuit pulses current through selected actuator wires under influence of the program control system. Current is separately controlled through each actuator wire, through the BeCu base to which the distal end of the TiNi wire is attached.

When current is supplied through a selected wire by the power circuit, the $I^2R$ heating effect causes the wire's temperature to rise. When the wire temperature is heated through or exceeds the phase change transition temperature of the particular shape-memory alloy material, then the wire contracts to its memory shape. As used herein, the term "heated through the phase change transition temperature" includes both the case of heating the wire to within the relatively narrow range of temperature in which phase change occurs and the case of heating above that temperature. Contraction of the wire applies a moment force to the distal end of the cantilever beam, which is forced to bend upwardly through the angle $\theta$ to the position shown in FIG. 4. When current is stopped, the actuator wire is cooled by ambient air to below its transition temperature. The spring force of the cantilever is then sufficient to elongate the wire back to its original length. This allows the cantilever to return to its original unextended position, as shown in FIG. 3.

In operation, the cantilever is brought to the "up" position of FIG. 4 by a pulse of current. The speed with which actuation occurs depends upon the power delivered to the wire and on the rate at which heat is conducted away from the wire. When current density is high, heating is rapid with a low rate of heat dissipation to the surrounding medium, which typically is air. For longer actuation times, a larger fraction of electrical power input is lost, and consequently actuation time is a non-linear function of input power.

For actuation times less than 0.1 second, the energy balance is dominated by Joule heating as follows:

$$E = I^2Rt$$

where
I = current in amperes
R = resistance of the SMA wire in ohms
t = time in seconds The current I is determined by a constant-current supply, and can range from 0.2 amperes up to 1.0 amperes or more. Resistance R is from 1 to 3 ohms for actuator wires which are typically 0.0075 cm (0.003 inches) in diameter and 1.5 cm long. (Resistivity of the shape-memory alloy is about 80 micro-ohm cm.) A typical actuator weighs 0.0004 grams. Actuation energy E is about 50 watt-sec per gram. From these values the predicted actuation time for a current of 0.5 amp is 0.027 sec. Actual measured time is about 0.035 sec, which is in substantial agreement with theory.

If current in the range of 0.2 to 0.5 amperes is held on continuously, the wire will overheat and be damaged. It has been determined experimentally that a current of 0.2 amperes is sufficient to maintain contraction of a 3-mil shape-memory alloy wire in still air. In the method of the preferred embodiment, the average current is reduced by pulse-width modulation of the signal to prevent damage to the shape-memory wire. Pulse-width will normally have a duty cycle of approximately 50% by controlling current on for approximately the same fraction of time it is off. Therefore the average current to hold the actuator on is approximately one-half the current required to bring it to the "up" position. The frequency of pulse-width modulation is approximately 20 hertz in the preferred embodiment.

Relative strengths of the cantilever and wire are selected such that the strength of the shape-memory alloy element is sufficient to deform the cantilever when the SMA wire is in its austenitic high-temperature state, but is elongated by the cantilever when the SMA wire is in its martensite (room temperature) state. Thus the position of the cantilever is dependent on whether the shape-memory alloy wire is heated or not.

FIG. 5 illustrates the control circuit 44 which provides constant current supply for each of the actuator wires. The control circuit is comprised of a plurality of identical driver circuits. In the drawing one of the driver circuits is shown and is comprised of the components encompassed by the dashed line 46. A separate driver circuit is provided to independently supply current to each SMA actuator wire. Thus, in FIG. 5 the illustrated driver circuit 46 is connected through terminal 48 with an end of one actuator wire 28, the other end of which is connected through line 49 with a switch 50 which is coupled with the +5 V power supply. The remaining actuator wires 28' are connected in parallel with the line 49 leading to switch 50, and the remaining driver circuits (not shown for purposes of clarity) are connected with their respective actuator wires through the remaining terminals 48'. Switch 50 is operated either manually or by other suitable means to provide on/off power to all driver circuits.

Circuit 44 includes an IC control chip 52, preferably of the type sold under the designation Sprague UCN5818, which provides a latching circuit function. Digital control information from a suitable computer microprocessor, not shown, is directed into chip 52 through a serial bit input line 54 and a strobe line 56. A plurality of output control lines 58, 58', 58" etc. lead from chip 52 and each of these output lines is connected into an associated driver circuit for controlling a respective one of the actuator wires. Thus, the output line 58 connects into the illustrated driver circuit 46 for controlling the actuator wire 28, while the output line 58' connects through its associated driver circuit (not shown) for controlling actuator 28'.

Operating under influence of the controls through input line 54 and strobe line 56, the latch circuits within chip 52 set the respective output lines 58 either at five volts (high) representing the latch ON state or at 0 volts (low) representing the latch OFF state. In each driver circuit 46, when the voltage at resistor 60 becomes high, then current is turned on through field effect transistor 62. The current flow is from the +5 V power supply through switch 50, line 49, actuator wire 28, transistor 62 and resistor 64 to ground. When sufficient current flows through resistor 64 to raise the base voltage of transistor 66, then this transistor conducts so that current flows through resistor 60, transistor 66 and resistor 68 to ground. This establishes feedback control which limits the current through the selected actuator wire 28, 28' etc. A light-emitting diode 70 is connected with switch 50 to provide a visual signal of the drive ON circuit. In each driver circuit 46 a light-emitting diode 72 is connected to also provide a visual signal to monitor the function of the circuit and verify its proper operation.

Control circuit 44 functions to control current through a selected SMA actuator wire 28 either at zero amperes when the voltage at resistor 60 is low, or at some value which is determined by the resistors 60, 68 and 64. The result is that the current in the selected actuator wire 28 is constant and does not depend upon the resistance of the individual actuator wires (which may vary) or on the resistances of the electrical contacts made to the SMA wires.

FIG. 6 illustrates an embodiment incorporating a tactile stimulator glove array 74 in accordance with the invention which is programmed and controlled by a computer system 76. In this embodiment the tactile elements and actuator means are incorporated into an instrumented glove 78 or other clinical diagnostic or virtual reality device. Control lines to and from the glove are combined in a cable 80 leading to a control circuit 82 which in turn is connected through a cable 84 with the host computer 76. A suitable power supply 86 is connected with the control circuit through cable. The computer is programmed to provide time-varying signals into control circuit 82 which in turn processes the signals and feeds them into the instrumented glove. The glove is worn on one hand of the patient, who senses the tactile feedback as the touch-stimulating portions of the tactile elements are moved by the shape-memory alloy actuators mounted within the glove.

The invention contemplates that the actuators in the different embodiments for the tactile elements may comprise shape-memory alloy materials in configurations other than wires. For example, the elements could be formed of shape-memory alloy films which move to and from their memory shapes when heated through the phase change transition temperatures. In addition, patterns of individual tactile elements can be held in fixed position (by steady-state control signals), or the elements could be rapidly changed (by transient control signals) to simulate the touch and feel of an object.

While the foregoing embodiments are at present considered to be preferred it is understood that numerous variations and modifications may be made therein by those skilled in the art, and it is intended to cover in the appended claims all such variations and modifications as fall within the true spirit and scope of the invention.

What is claimed is:

1. A tactile stimulator array system for providing tactile feedback to a person comprising the combination of at least one tactile element having a touch-stimulating portion, a reference structure, means for mounting the tactile element in a predetermined array relative to said reference structure for contact of said touch-stimulating portion by sense organs of the person, actuator means for moving the touch-stimulating portion between first and second positions, said actuator means including at least one actuator, said actuator being comprised of a shape-memory alloy material which changes between a first memory shape when heated through the phase change transition temperature of the material and a second shape when cooled below that temperature, and coupling means for operatively coupling said actuator with a respective tactile element for moving the touch-stimulating portion of the element between said first and second positions responsive to said change in shape of the actuator whereby movement of the touch-stimulating portion relative to the reference structure can be sensed by the person.

2. A tactile stimulator array system as in claim 1 in which said tactile element is comprised of a cantilever beam having a proximal end and a distal end, said proximal end being carried by the reference structure and said distal end comprising said touch-stimulating portion, said beam being formed of a flexible material having elastic memory so that the beam bends responsive to said change in shape of the actuator.

3. A tactile stimulator array system as in claim 2 in which said reference structure is comprised of a touch plate having at least one opening, said touch-stimulating portion of the tactile element being sized sufficient to permit such portion to move at least partially through the respective opening, and said actuator means moving a touch-stimulating portion of a selected tactile element to its second position where such touch-stimulating portion projects at least partially through the opening of the touch plate where it can be sensed by the person.

4. A tactile stimulator array system as in claim 1 further includes control means for heating selected actuators in a predetermined sequence for a predetermined time period sufficient to cause the shape-memory alloy material thereof to change to its memory shape.

5. A tactile stimulator array system as in claim 4 in which said control means includes control circuit means for directing pulses of electric current through the selected actuator.

6. A tactile stimulator array system as in claim 5 in which the control circuit means includes circuit means for generating pulse-width modulated current signal through the actuator for predetermined pulse time which is sufficient to prevent overheating of the actuator, while such actuator are in their memory shapes.

7. A method for providing tactile stimulation feedback for a person's sense organs, the method including the steps of mounting a tactile element means for movement between first and second positions relative to a reference structure, with the tactile element means in its second position being oriented relative to the reference structure for sensing by the person, coupling an actuator means of shape-memory alloy material to the tactile element means, said material being in a memory shape when heated through its phase change transition temperature and being in an other shape when cooled below that temperature, heating the actuator means through its phase change transition temperature to cause it to change to its memory shape for moving the tactile element means to its second position responsive to said change of shape of the actuator means to its memory shape, cooling the actuator means to below its phase change transition temperature to cause the actuator means to move to its other shape for moving the tactile element means to its first position while moving the actuator means to its other shape, and generating a control signal having successive pulses which are varied over time in a predetermined sequence for causing the actuator means to undergo successive cycles of heating and cooling responsive to the pulses to cause the actuator means to change between said memory shape and other shape for causing movement of the tactile element means relative to the reference structure.

8. A method as in claim 7 in which said tactile element means having a plurality of tactile elements, and said actuator means having a plurality of actuation said actuators and the associated tactile elements are positioned in a predetermined array, and said actuators are individually heated and cooled to cause them to respectively change between their memory shape and other shape in accordance with a predetermined sequence for causing movement of the tactile elements relative to the reference structure.

9. A method as in claim 8 in which said time-varying control signals are generated for operating individual actuators in accordance with said predetermined sequence, and the actuators are heated responsive to said time-varying signals.

10. A method as in claim 9 in which electric current pulses are directed through the actuators responsive to said time-varying signals to raise the temperature of selected actuators through said phase change transition temperature.

11. A method as in claim 10 in which the pulse-width of said electric current pulses is modulated at a predetermined frequency sufficient to prevent overheating of the actuator while it is in its memory shape.

12. A method as in claim 11 in which said pulse-width of said electric current pulses modulated at a predetermined frequency is carried out by controlling the pulse-width of each current pulse to be on for approximately the same fraction of time that the current pulse is off.

13. A method as in claim 7 in which said sequence of pulses is rapidly varied to correspondingly vary the sequence of movement of the tactile elements.

14. A method as in claim 7 further includes the step of holding the tactile element on said human sense organ while the sense organ moves.

15. A tactile stimulator array system for providing tactile feedback to a person comprising the combination of a plurality of tactile elements, each element having a touch-stimulating portion, a reference structure, means for mounting the tactile elements in a predetermined array relative to said reference structure for contact of said touch-stimulating portions by sense organs of a person, actuator means for moving the touch-stimulating portions between first and second positions, said actuator means including a plurality of actuators, each actuator being formed of a shape-memory alloy material which changes between a first memory shape when heated through the phase change transition temperature of the material and a second shape when cooled below that temperature, coupling means for operatively coupling each actuator with a respective tactile element for moving such element and its associated touch-stimulating portion between said first and second positions responsive to said change in shape of the actuator whereby movement of the touch-stimulating portions relative to the reference structure can be sensed by the person, said tactile elements being comprised of cantilever beams having proximal ends and distal ends, said proximal ends being carried by the reference structure and said distal ends comprising said touch-stimulating portions, said beams being formed of a flexible material having elastic memory, said actuators being in the shape of elongate strands, and said coupling means attaches said strands to a portion of respective beams at a position which applies a moment force for bending the beams from a first position to a second position when the alloy material changes to its memory shape.

16. A tactile stimulator array system as in claim 15 in which said strands contract when the alloy material changes to its memory shape and said strands elongate when the alloy material is changed to its second shape, and the force of elastic memory of said beams acts against the strands to cause them to elongate as the beam bend back to their first positions.

17. A tactile stimulator array system for providing tactile feedback to a person comprising the combination of a plurality of tactile elements, each element having a touch-stimulating portion, a reference structure means for mounting the tactile elements in a predetermined array relative to said reference structure for contact of said touch-stimulating portions by sense organs of a person, actuator means for moving the touch-stimulating portions between first and second positions, said actuator means including a plurality of actuators, each actuator comprised of a shape-memory alloy material which changes between a first memory shape when heated through the phase change transition temperature of the material and a second shape when cooled below that temperature, coupling means for operatively coupling each actuator with a respective tactile element for moving such element and its associated touch-stimulating portion between said first and second positions responsive to said change in shape of the actuator whereby movement of the touch-stimulating portions relative to the reference structure can be sensed by the person wherein said tactile elements are formed by a base plate being comprised of a sheet of flexible metal and means forming a pattern of spaced-apart, parallel cuts through the metal to define laterally spaced-apart beams which are integrally joined at their proximal ends to un-cut portions of the base plate.

18. A method for providing tactile stimulation feedback for a person's sense organs, the method including the steps of mounting a tactile element means for movement between first and second positions relative to the reference structure for sensing by the person, coupling an actuator means of a shape-memory alloy material to the tactile element means, said material changing between a memory shape when heated through its phase change transition temperature and an other shape when cooled below that temperature, heating the actuator means through its phase change transition temperature to cause it to change its memory shape for moving the tactile element means to its second position responsive to said change of shape of the actuator means to its memory shape, cooling the actuator means to below its phase change transition temperature to cause the actuator means to move to its other shape for moving the tactile element means to its first position while moving the actuator means to its other shape, said tactile element means having a plurality of tactile elements and said actuator means having a plurality of actuators, said actuators and the associated tactile elements are positioned in a predetermined array, said actuators are individually heated and cooled to cause them to respectively change between their memory shape and other shape in accordance with a predetermined sequence for causing movement of the tactile elements relative to the reference structure, generating time-varying control signals for operating individual actuators in accordance with said predetermined sequence, the actuators are heated responsive to said time-varying signals, directing electric current pulses through the actuators responsive to said time-varying.

* * * * *

UNITED STATES PATENT AND TRADEMARK OFFICE
CERTIFICATE OF CORRECTION

PATENT NO. : 5,165,897
DATED : November 24, 1992
INVENTOR(S) : Alfred D. Johnson It is certified that error appears in the above-indentified patent and that said Letters Patent is hereby corrected as shown below:

Column 4, line 13, after "of a plurality," insert --shown as thirty, of parallel openings 16, 16' bored--.

In the claims at column 10, line 40 after "reference structure" insert --, with the element in its first position being oriented relative to the reference structure--.

In the claims at column 10, line 67 after "time-varying" insert --signals to raise the temperature of selected actuators through said phase change transition temperature--.

Signed and Sealed this

Twenty-first Day of December, 1993

*Attest:*

BRUCE LEHMAN

*Attesting Officer*     Commissioner of Patents and Trademarks